(12) United States Patent
Peters et al.

(10) Patent No.: US 11,634,185 B2
(45) Date of Patent: Apr. 25, 2023

(54) SPORT UTILITY VEHICLE STORAGE SYSTEM

(71) Applicant: DECKED LLC, Ketchum, ID (US)

(72) Inventors: Jake Peters, Ketchum, ID (US); Tasche Streib, Ketchum, ID (US); Michael Witt, Boise, ID (US); Blake Pachner, Boise, ID (US); Calvin Allan, Ketchum, ID (US)

(73) Assignee: DECKED, LLC, Ketchum, ID (US)

( * ) Notice: Subject to any disclaimer, the term of this patent is extended or adjusted under 35 U.S.C. 154(b) by 344 days.

(21) Appl. No.: 17/116,723

(22) Filed: Dec. 9, 2020

(65) Prior Publication Data

US 2021/0179198 A1 Jun. 17, 2021

Related U.S. Application Data

(60) Provisional application No. 62/947,347, filed on Dec. 12, 2019.

(51) Int. Cl.
*B60R 9/00* (2006.01)
*B62D 33/02* (2006.01)
*B62D 33/08* (2006.01)
*B60R 9/06* (2006.01)
*B62B 3/02* (2006.01)

(52) U.S. Cl.
CPC .......... *B62D 33/0207* (2013.01); *B60R 9/065* (2013.01); *B62D 33/08* (2013.01); *B62B 3/02* (2013.01)

(58) Field of Classification Search
CPC ...... B62D 33/0207; B62D 33/08; B60R 7/02; B60R 5/04; B60R 9/065; B60P 1/6427

USPC .......... 296/26.08, 26.09, 37.6, 39.2
See application file for complete search history.

(56) References Cited

U.S. PATENT DOCUMENTS

| 4,733,898 A | 3/1988 | Williams |
| 4,915,437 A * | 4/1990 | Cherry .................... B60R 11/06 296/37.6 |
| 5,657,916 A | 8/1997 | Tackett |
| 5,685,593 A | 11/1997 | O'Connor |
| 6,338,518 B1 | 1/2002 | D'Annunzio et al. |
| D466,469 S * | 12/2002 | Nelson, Jr. .................... D12/221 |
| 6,811,068 B2 * | 11/2004 | Johnson .................... B60R 9/00 296/37.6 |
| 7,419,203 B2 | 9/2008 | Chandler et al. |
| 2010/0283279 A1 * | 11/2010 | Suzuki .................... B60R 5/041 296/26.09 |
| 2014/0284365 A1 | 9/2014 | Smith et al. |

* cited by examiner

*Primary Examiner* — Stephen T Gordon
(74) *Attorney, Agent, or Firm* — Norton Rose Fulbright US LLP; Gerard Messina; Barry Greenbaum

(57) ABSTRACT

A vehicle storage system may include a deck configured to span substantially a total width of a vehicle bed, and a drawer assembly including a supporting frame and a tub, the drawer assembly configured to extend, via a guide channel assembly, in a longitudinal direction of the vehicle bed past the deck, and configured to retract, via the guide channel assembly, under the deck, the drawer assembly configured to detach from the guide channel assembly and be removed from the vehicle bed, the deck configured to rotate between a closed position and an open position relative to the drawer assembly. The vehicle storage system may further include a cart affixed to a bottom portion of the drawer assembly.

23 Claims, 15 Drawing Sheets

SPORT UTILITY VEHICLE STORAGE SYSTEM

INCORPORATION BY REFERENCE

The following is hereby incorporated by reference: U.S. Provisional Application No. 62/947,347, filed Dec. 12, 2019, and U.S. Publication No. 2018/0118129 by Smith et al., published on May 3, 2018, and entitled "Midsize Vehicle Storage System," both of which are hereby incorporated by reference in their entirety.

FIELD OF THE INVENTION

The present invention relates generally to a vehicle storage system, and a method of making such a vehicle storage system.

BACKGROUND INFORMATION

Existing vehicle storage systems such as truck storage systems generally comprise a box frame or cabinet structure having drawers that is placed within a vehicle bed such as a truck bed and secured to the truck bed via brackets and holes drilled in the truck bed. Such storage systems generally do not extend the full width of the truck bed, thus not fully utilizing the available storage space, and the storage systems may create gaps and areas between the storage systems and the truck bed sidewalls in which various materials can become trapped and/or lost. Further, the loading and/or hauling of materials on top of the storage systems is rendered more difficult and less reliable by such gaps and areas between the storage systems and the truck bed sidewalls. In addition, the box frame or cabinet structure may not be designed to carry heavy loads that would be suitable for the truck bed alone, and/or the use of the drawers within the storage systems may be adversely affected by such heavy loads placed thereon. Moreover, storage systems that may be designed to carry heavy loads may add excessive weight to the truck bed, thereby adversely affecting vehicle performance, such as for example, handling, torque, speed, fuel economy, and others. In addition, truck storage systems are not easily adaptable to different sized vehicles, even within a same class of vehicles, due to the variety of dimensions of the vehicle itself and/or, for example, the interior trim panels. Further, it is often difficult to insert items into and/or remove items from existing storage systems due to the complexity and awkwardness of opening and closing the storage systems. Further, it is often burdensome to transport items to and from the vehicle to another site due to the weight of the items contained within the storage system.

SUMMARY

In accordance with an exemplary embodiment of the present invention, a vehicle storage system such as, for example, a truck storage system may include a deck configured to span substantially a total width of a vehicle bed, and a drawer assembly including a supporting frame and at least one tub, wherein the drawer assembly is configured to extend, via a guide channel assembly, in a longitudinal direction of the vehicle bed past the deck, and configured to retract, via the guide channel assembly, under the deck, wherein the drawer assembly is configured to detach from the guide channel assembly and be removed from the vehicle bed, wherein the deck is configured to rotate between a closed position and an open position relative to the drawer assembly.

Additionally, the deck includes a front deck portion and a rear deck portion, the front deck portion and the rear deck portion hinged to each other.

In a first operating state, only the front deck portion is opened, in a second operating state, only the rear deck portion is opened, and in a third operating state, both the front deck portion and the rear deck portion are opened.

In an example embodiment of the invention, the front deck portion and the rear deck portion correspond, respectively, to a front and a rear portion of the at least one tub.

In an example embodiment of the invention, the front and the rear portions of the at least one tub are separated by a divider.

In an example embodiment of the invention, the deck is configured to rotate at a midway point of the deck to open and/or close.

In an example embodiment of the invention, the deck may include a front portion hinged to a middle portion, which is in turn hinged to a rear portion. During operation, the deck may be opened in three states: the front portion only, the front and middle portion, or the front, middle, and rear portion.

In an example embodiment of the invention, the deck further includes a front transverse vertical support, wherein the deck is hinged to the front transverse vertical support to open and close the deck relative to the drawer assembly.

In an example embodiment of the invention, the at least one tub is configured to detach from the guide channel assembly while the supporting frame remains attached thereto.

In an example embodiment of the invention, the drawer assembly is situated between at least two side support feet.

In an example embodiment of the invention, the deck includes a front deck portion, a middle deck portion, and a rear deck portion, wherein the rear deck portion is hinged to the middle deck portion, and the middle deck portion is hinged to the front deck portion.

In an example embodiment of the invention, in a first operating state, only the rear deck portion is opened, in a second operating state, only the rear deck portion and the middle deck portions are opened, and in a third operating state, all of the deck portions are opened.

In an example embodiment of the invention, the deck is configured to rotate at at least two different sections of the deck to open and/or close.

In an example embodiment of the invention, the at least one tub includes at least two tubs that are arranged side by side in the longitudinal direction of the vehicle bed.

In an example embodiment of the invention, the vehicle storage system is configured to be assembled and/or disassembled by an operator without tools.

In an example embodiment of the invention, the assembly may incorporate multiple drawers/tubs (e.g. two or more) each configured to slide and allow detachment from the supporting frame.

In another example embodiment of the invention, the vehicle storage system includes a deck configured to span substantially a total width of a vehicle bed, a drawer assembly including a supporting frame and at least one tub, wherein the drawer assembly is configured to extend, via a guide channel assembly, in a longitudinal direction of the vehicle bed past the deck, and configured to retract, via the guide channel assembly, under the deck, and a cart affixed to a bottom portion of the drawer assembly, wherein the drawer assembly is configured to detach from the guide channel assembly and be removed along with the cart from the vehicle bed, wherein the deck is configured to rotate between a closed position and an open position relative to the drawer assembly.

In an example embodiment of the invention, the cart is configured to switch between a collapsed configuration where the cart is folded up against the drawer assembly, and an expanded configuration where the cart is unfolded and at least partially supported by the ground.

In an example embodiment of the invention, the cart includes a lower frame assembly, a left side support assembly, a right side support assembly, a storage tray, and at least two wheels.

In an example embodiment of the invention, the cart is configured to unfold from the drawer assembly via the left side support assembly and the right side support assembly.

In an example embodiment of the invention, a position of the lower frame assembly in the collapsed configuration is substantially parallel to a position of the lower frame assembly in the expanded configuration.

In an example embodiment of the invention, the storage tray is removably mounted or attached to the lower frame assembly and configured to collapse and expand along with the lower frame assembly.

In an example embodiment of the invention, the cart is configured to extend, along with the drawer assembly, in the longitudinal direction of the vehicle bed past the deck, and configured to retract, along with the drawer assembly, under the deck.

In an example embodiment of the invention, the guide channel assembly included drawer slides having a c-shaped channel which slideably receive a portion of the supporting frame and/or the at least one tub.

In an example embodiment of the invention, the tub or tubs and/or the supporting frame are configured to detach from the cart.

In an example embodiment of the invention, the deck includes a front deck portion and a rear deck portion, the front deck portion and the rear deck portion hinged to each other, wherein, in a first operating state, only the front deck portion is opened, in a second operating state, only the rear deck portion is opened, and in a third operating state, both the front deck portion and the rear deck portion are opened.

Alternatively, in an example embodiment of the invention, the deck includes a front deck portion, a middle deck portion, and a rear deck portion, the front deck portion hinged to the middle deck portion, which is in turn hinged to the rear deck portion, wherein, in a first operating state, only the rear deck portion is opened, in a second operating state, only the front and the middle deck portions are opened, and in a third operating state, all of the deck portions are opened.

In an example embodiment of the invention, the deck is configured to rotate at a midway point of the deck to open and/or close.

In accordance with an example embodiment of the present invention, a vehicle storage system may include a deck configured to span substantially a total width of a vehicle bed, at least two side support feet, each side support foot situated at a respective side of the vehicle bed and configured to support the deck.

Additionally, to accommodate vehicles having insufficient floor space within and forward of a wheelhouse component of the vehicle bed to allow for a side support foot to provide adequate vertical stability, smaller side support feet may be provided which are secured/tied together via a front vertical transverse support. The front vertical transverse support may be a robust structure that is also provided to secure/tie down the front of the truck storage system to the truck bed.

The deck may include two, non-handed deck halves configured to interleave with each other and be joined together by interengaging features or corresponding countersunk holes and fasteners. Further, the deck may have a movable and/or removable center section that is supported on the sides by load rest features on the support feet. The center deck panel may be joined to the front vertical transverse support by interengaging features or corresponding countersunk holes and fasteners, allowing the center deck panel to be opened or removed to access the contents of the drawer(s). Additionally, the center deck panel may be segmented further with the segments joined together by interengaging features or corresponding countersunk holes and fasteners to allow partial or full opening of the panel. In accordance with an exemplary embodiment of the present invention, the deck halves are handed and have a central movable and/or removable section. Outer lateral edges of the deck may be processable to match sidewall profiles of a plurality of different vehicle beds. In addition, the deck may include transverse reinforcement beams configured to increase strength of the deck. Further, the deck may be attached to upper surfaces of the two side support feet by fasteners, and/or the front vertical transverse support, by protrusions and corresponding countersunk holes and/or fasteners.

The deck may include four openings, each opening leading to a compartment defined by an interior of each side support foot, and may include drain provisions to channel liquid away from the compartment interior, and non-handed covers may cover each of the four openings, an underside of each cover including cup holders, trays and/or compartments. A ruler plate may be situated at a rearward edge of the deck and configured to act as a scuff plate.

The two side support feet may include two, non-handed support feet. Each support foot may be attached to existing tie-down points of the vehicle bed via J-hooks, brackets and/or fasteners, and each support foot may be attachable to existing tie-down points of a plurality of different vehicle beds. In addition, each support foot may include drain features to channel liquid away from the compartment interior. Further, the side support feet may incorporate the drawer guide track or a means to locate and attach a separate drawer guide system.

The front vertical transverse support may act as a load rest without direct attachment to the vehicle bed. The front vertical transverse support may stably support the deck in a plurality of different vehicle beds. The front vertical transverse support may be attached to the front of the side support feet by protrusions and corresponding countersunk holes and/or fasteners and be attached to the vehicle bed front panel via brackets and/or fasteners.

The deck, the side support feet, and/or the front vertical transverse support may be made of high density polyethylene.

The vehicle storage system may also include at least one drawer assembly situated between a side support foot on one side and a side support foot on an other side, the drawer assembly configured to be slidable in the longitudinal direction of the vehicle bed via wheels and corresponding self-centering guide channels. The guide channels may mount to a telescoping extension member, mounted to the side support feet to receive the front wheels of the drawer assembly. Further, the guide channel on one side of the drawer may be connected with the guide channel on an other side of the drawer via a lateral member, to ensure the respective guide channels move longitudinally in unison. The guide channel may include an outer rear wheel, and the drawer assembly may include integral, guide channels to receive each of the outer rear wheels. Additionally, a tubular reinforcement may be used to affix the rear of the side support foot on one side with the rear of the side support foot on an other side to ensure proper drawer opening size by enforcing lateral and vertical alignment of the respective drawer guide channels and rear drawer wheels.

The drawer assembly may include reinforcement beams or a secondary tubular framework structure around its periphery to increase the strength of the drawer Additionally, the drawer assembly may include a latch and a lock configured to interengage with a reinforcement beam on an underside of the deck. In addition, the drawer assembly may include a notch, a raised surface and/or a sloped surface on its rearward, lower surface configured to provide clearance to a lowered tailgate of the vehicle bed. The drawer assembly may include at least two drawer assemblies that are nestable for packaging, shipping and/or storage. Further, the drawer assembly may include integral drawer stops configured to prevent falling out of the drawer assembly from the truck storage system, and the drawer assembly may include detent features in the lower guide channels to hold the drawer(s) in the full open position.

The vehicle storage system may be manufacturable in long and short versions using a single set of tooling and tool inserts.

The storage system frame may be designed to allow quick, tool-free assembly and disassembly by the user. Each wall of the storage system frame may include joining geometry such as dovetails, dados, mortise and tenon, tongue and groove, box joints, etc.

In accordance with a second exemplary embodiment of the present invention, the vehicle storage system may include a deployable framework attached to the underside of the drawer that when extended vertically, and with attached tray and deployable front and/or rear wheels, may be used as a rolling cart to transport content to and from the vehicle.

Example embodiments of the present invention are described in more detail below with reference to the appended Figures.

DETAILED DESCRIPTION

As used herein, the terms "front," "rear," "left side," and "right side" refer to directions with reference to a vehicle, e.g., a sport utility vehicle, in which the vehicle storage system may be installed. For example, the term "front" refers to a forward-moving direction of the vehicle, the term "rear" refers to a rearward-moving direction of the vehicle, the term "left side" refers to a driver side of the vehicle (as commonly used in the U.S.), and the term "right side" refers to a passenger side of the vehicle (as commonly used in the U.S.).

Figure 1:
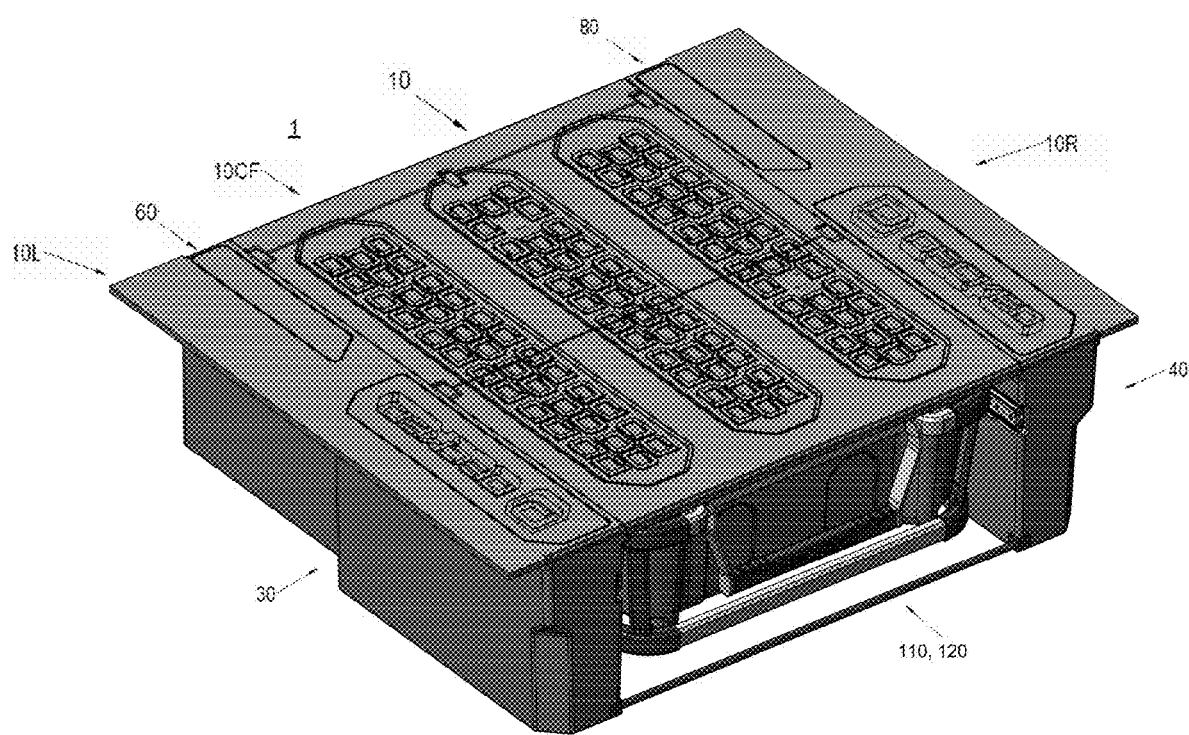
FIG. 1 shows a top perspective view of a first exemplary embodiment of a vehicle storage system according to the present invention, depicted with a drawer in a fully stowed state.
Figure 6:
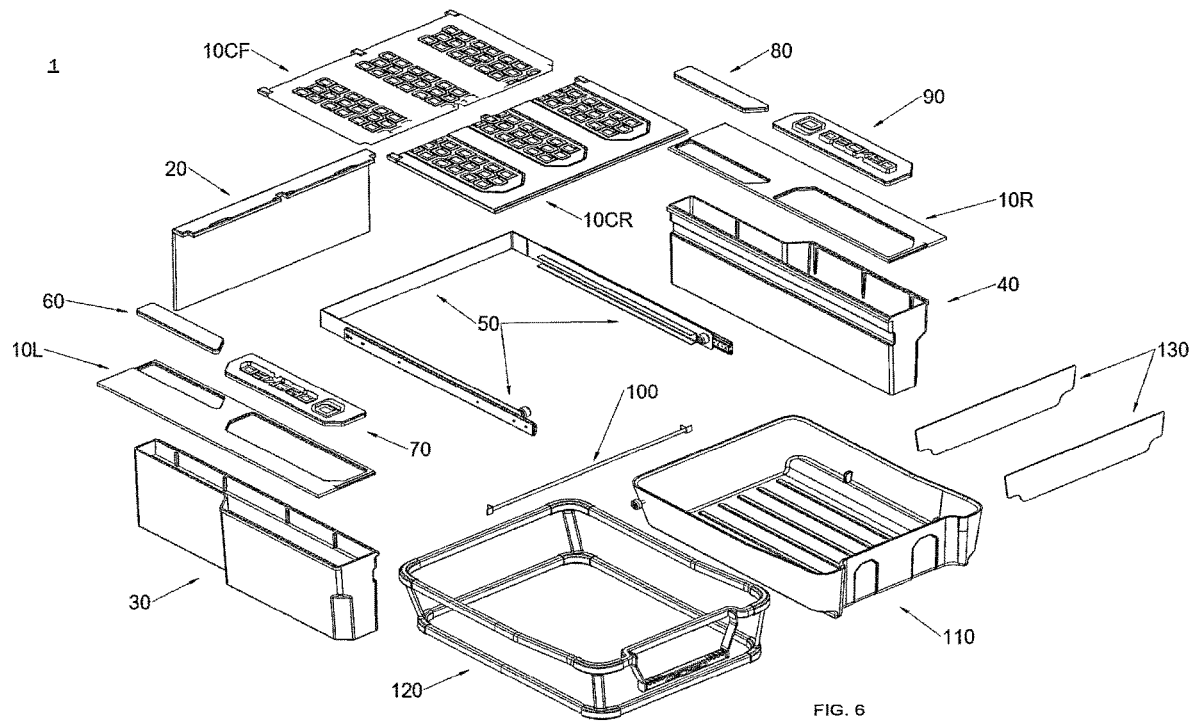
FIG. 6 shows a partially exploded view of the first exemplary embodiment of the vehicle storage system according to the present invention.

FIG. 1 shows a top perspective view and FIG. 6 shows a partially exploded view of a first exemplary embodiment of a vehicle storage system 1 according to the present invention. As shown in FIGS. 1 and 6, the vehicle storage system 1 may comprise a main body including a deck 10 comprised of a left deck half 10L, a right deck half 10R, a center front deck 10CF, and a center rear deck 10CR. The vehicle storage system 1 may also include a front transverse vertical support 20, a left side support foot 30 (which may be formed as a single integral component), a right side support foot 40 (which may be formed as a single integral component), a guide channel assembly 50, foot support covers 60, 70, 80, 90, a rear torsion brace 100, a drawer tub 110, a drawer supporting frame 120, and drawer dividers 130, all of which will be described further herein. The vehicle storage system 1, as shown in FIG. 1, for example, may be sized to fit both long and short truck beds, and may cover substantially the full width of a vehicle bed.

FIGS. 2,3,4 and 5 show various operational states of the first exemplary embodiment of the vehicle storage system 1 according to the present invention.

FIG. 1 shows vehicle storage system 1 in a retracted and closed position, in which the drawer assembly including drawer tub 110 and drawer supporting frame 120 are retracted into the main body of the vehicle storage system 1, and in which center front deck 10CF and center rear deck 10CR are both in a closed position. Such an operational state may occur, for example, when a vehicle is in motion and/or when the drawer contents are not needed. Center front deck 10CF and center rear deck 10CR may be provided so as to correspond to a front and rear portion of drawer tub 110, respectively, and which portions may be separated by drawer dividers 130.

Figure 2:
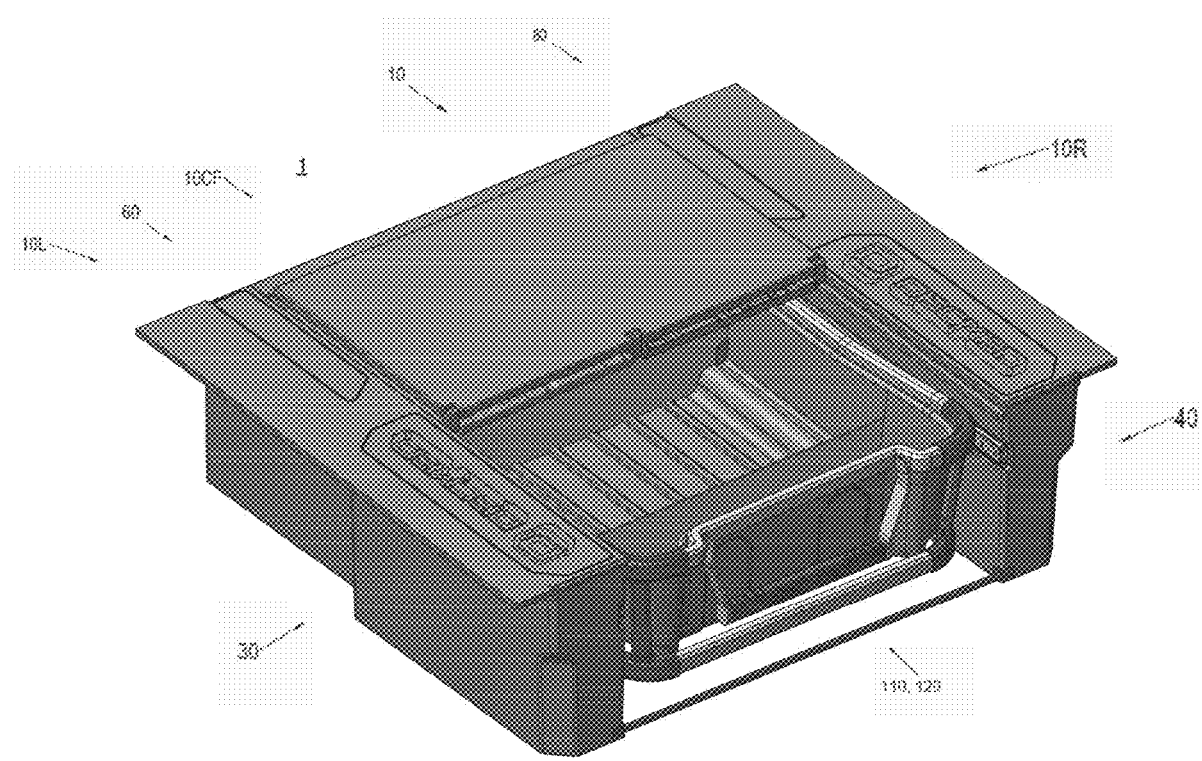
FIG. 2 shows a top perspective view of a first exemplary embodiment of a vehicle storage system according to the present invention, depicted with the center deck rear panel in an open state.

FIG. 2 shows vehicle storage system 1 in a retracted and partially-opened position, in which the drawer assembly including drawer tub 110 and drawer supporting frame 120 are retracted into the main body of the vehicle storage system 1, while center rear deck 10CR is in an opened position and center front deck 10CF is in a closed position. Such an operational state may occur, for example, when the drawer contents in the rear portion of drawer tub 110 are intended to be removed or contents are to be added to the rear portion, but not contents in the front portion of drawer tub 110, or when there are no contents in the front portion of drawer tub 110. While FIG. 2 shows the center deck panel opened and fully folded at a midway point thereof, the center deck panel may instead be opened at other points along the deck and/or may be folded only partially. For example, the center deck panel may be folded in a direction perpendicular to the deck and held up by one or more retractable stands protruding from the deck.

Figure 3:
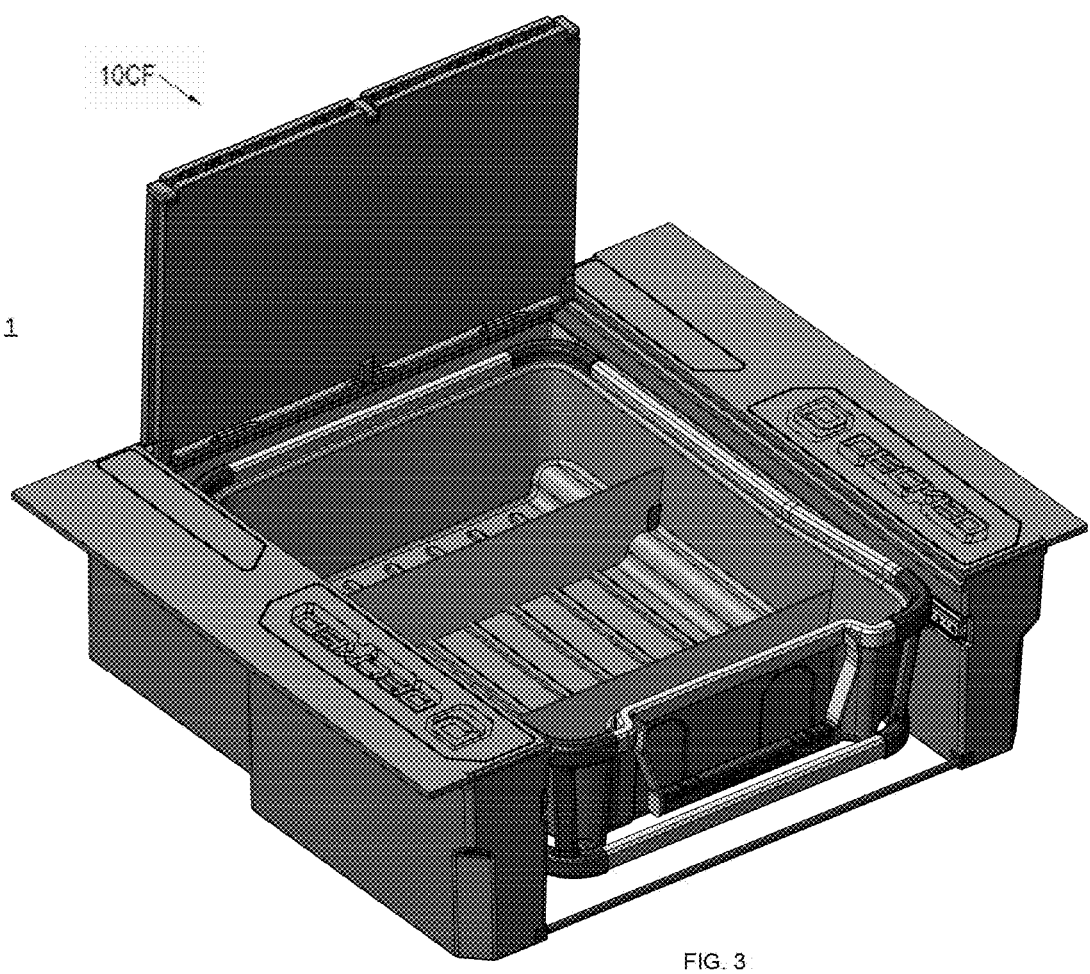
FIG. 3 shows a top perspective view of a first exemplary embodiment of a vehicle storage system according to the present invention, depicted with the center deck front and rear panels in an open state.

FIG. 3 shows vehicle storage system 1 in a retracted and opened position, in which the drawer assembly including drawer tub 110 and drawer supporting frame 120 are retracted into the main body of the vehicle storage system 1, and both center front deck 10CF and center rear deck 10CR are in an opened position. Such an operational state may occur, for example, when the drawer contents in both the rear portion of drawer tub 110 and in the front portion of drawer tub 110 may be needed or when contents are to be added to both portions. Drawer divider 130 may be used to separate the two portions and to detachably fit within the drawer assembly. Drawer divider 130 may be installed at any position within the drawer assembly to provide dynamically sized and positioned compartments within the assembly. While FIG. 3 shows a two compartment drawer assembly separated by a single divider 130, more than two compartments, for example, three or four, and/or more than one divider, for example, two or three, may comprise or be included in the drawer assembly.

Figure 4:
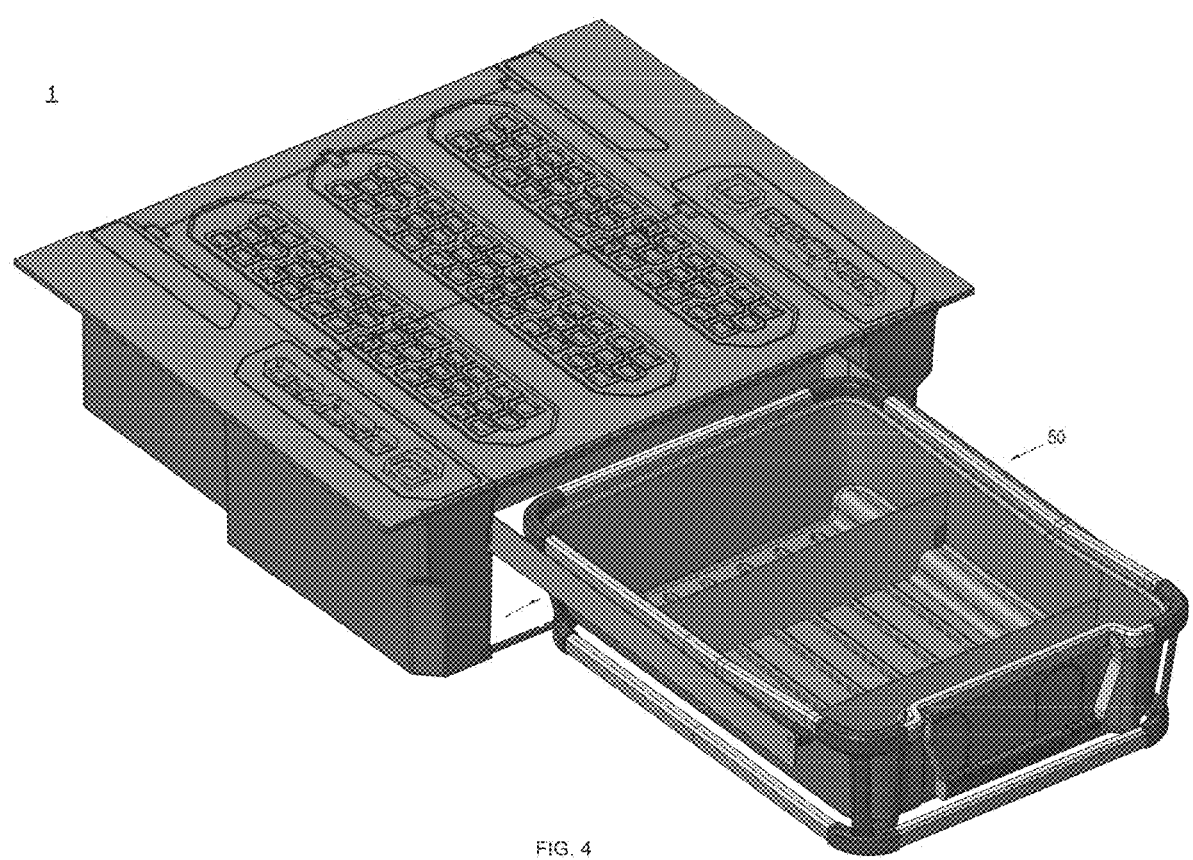
FIG. 4 shows a top perspective view of a first exemplary embodiment of a vehicle storage system according to the present invention, depicted with the drawer in an open state.

Center front deck 10CF may be hinged to a portion of vehicle storage system 1 such as to front transverse vertical support 20 to open and close center front deck 10CF relative to the drawer assembly (as illustrated in FIG. 3). This may allow gaining access to contents in a storage area of the drawer tub 110 without the need to deploy/extend the drawer assembly (as shown in FIG. 4). When center front deck 10CF is in an open position, it may remain in an upright position with center rear deck 10CR folded in front of center front deck 10CF. Alternatively, center rear deck 10CR may remain in an upright position above center front deck 10CF, or in other positions relative to center front deck 10CF. Center front deck 10CF may also remain in other positions relative to the drawer tub 110. In addition, center front deck 10CF may be hinged to center rear deck 10CR to open and close center rear deck 10CR relative to the drawer assembly. For example, center rear deck 10CR may be opened while center front deck 10CF is kept closed (as illustrated in FIG. 2). As shown in FIG. 3, center front deck 10CF may be hinged to center rear deck 10CR at three points. Alternatively, center front deck 10CF may be hinged to center rear deck 10CR at one or two point or at more than three points.

FIG. 4 shows vehicle storage system 1 in an extended and closed position, in which the drawer assembly including drawer tub 110 and drawer supporting frame 120 are extended out of the main body of the vehicle storage system 1, while both center front deck 10CF and center rear deck 10CR are in a closed position. Such an operational state may occur, for example, when the drawer itself is to be removed from the vehicle storage system 1 (as illustrated in FIG. 5) or when contents within the drawer are more easily removed or when contents are more easily placed within the drawer in this matter as opposed to opening the deck.

Drawer tub 110 and drawer supporting frame 120 may be extended from and retracted into the main body of the vehicle storage system 1 via guide channel assembly 50, which may include drawer slides having a c-shaped channel which slideably receives a portion of drawer supporting frame 120 and/or drawer tub 110, allowing drawer supporting frame 120 and/or drawer tub 110 to extend and retract from the main body of the vehicle storage system 1. Guide channel assembly 50 may comprise rails, rollers or other mechanisms which allow for extension and retraction.

Figure 5:
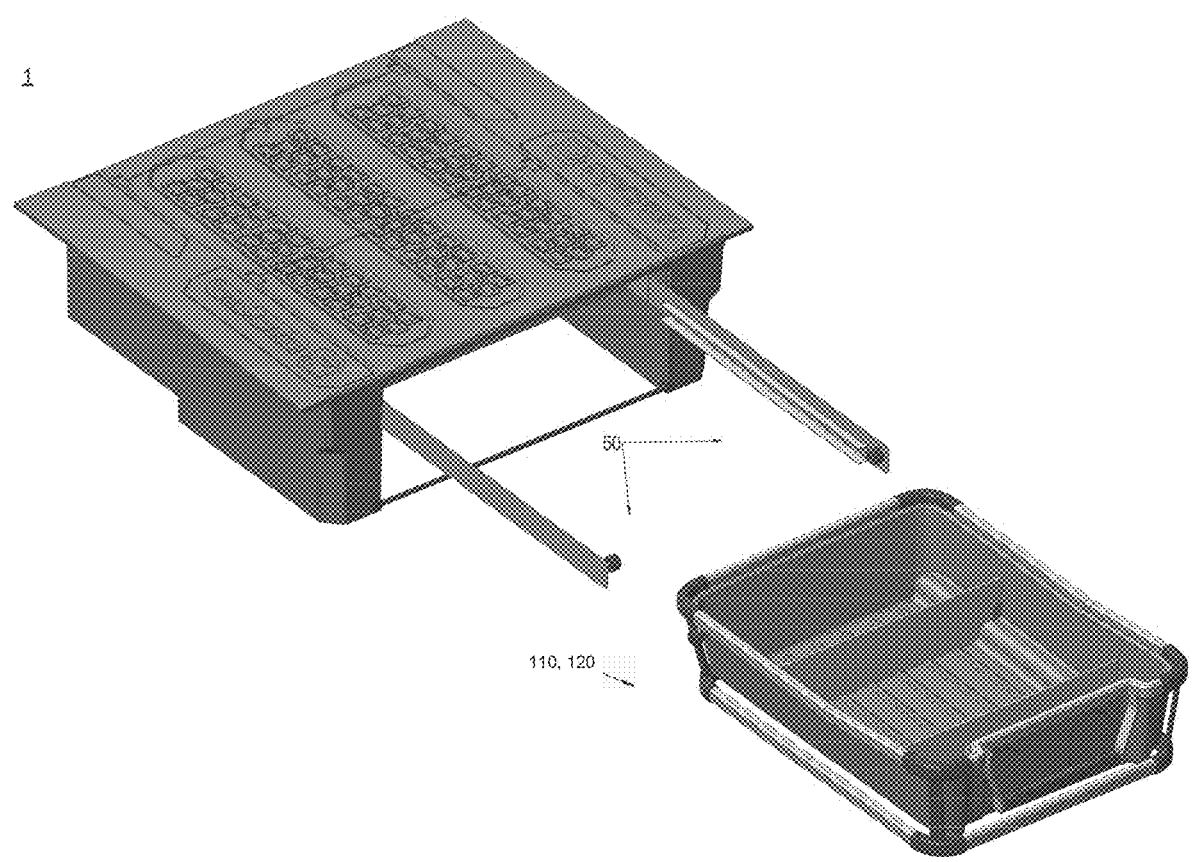
FIG. 5 shows a top perspective view of a first exemplary embodiment of a vehicle storage system according to the present invention, depicted with the drawer in an open and removed state.

FIG. 5 shows vehicle storage system 1 in an extended, closed, and detached position, in which the drawer assembly including drawer tub 110 and drawer supporting frame 120 are extended out of the main body of the vehicle storage system 1 and detached therefrom, while both center front deck 10CF and center rear deck 10CR are in a closed position. As is shown in FIG. 5, drawer tub 110 and drawer supporting frame 120 may be detached from the guide channel assembly 50 and removed from the vehicle storage system 1. In this way, for example, contents in drawer tub 110 may be transported to and from the vehicle to another site. Alternatively, only drawer tub 110 may be detached from guide channel assembly 50 and removed from the vehicle storage system 1, but not drawer supporting frame 120.

FIGS. 2-5 show drawer dividers 130, which allow for the separation of drawer tub 110 into two or more compartments. The compartments may be provided to store and transport any object capable to fit into the compartment, such as, for example, food or tools. As described above, drawer dividers 130 may be removable and may be moved within drawer tub 110 to allow for different sized compartments.

In a second embodiment according to the present invention, shown in FIG. 7-11, a cart can be affixed to the bottom of the drawer assembly to allow payload to be transported to or removed from the vehicle. The cart may be folded into a collapsed position against the drawer assembly or partially or fully extended/deployed.

Figure 7:
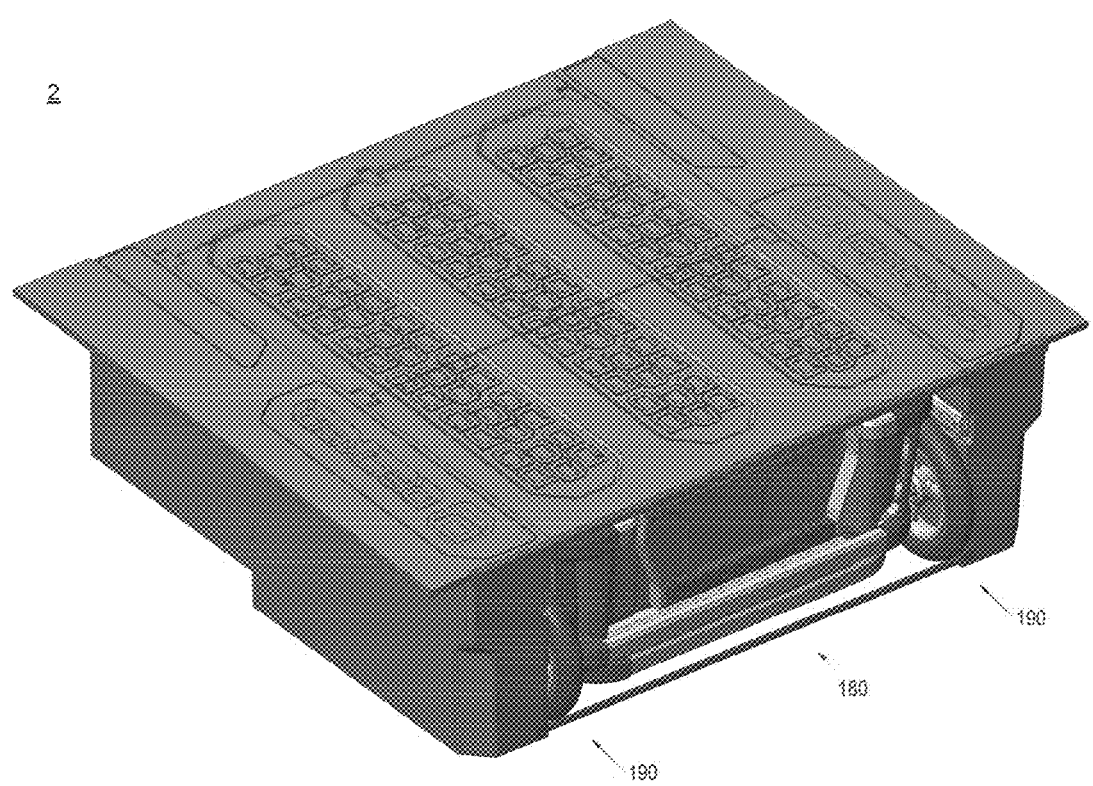
FIG. 7 shows a top perspective view of a second exemplary embodiment of a vehicle storage system according to the present invention, depicted with the drawer and a cart in a fully stowed state.
Figure 11:
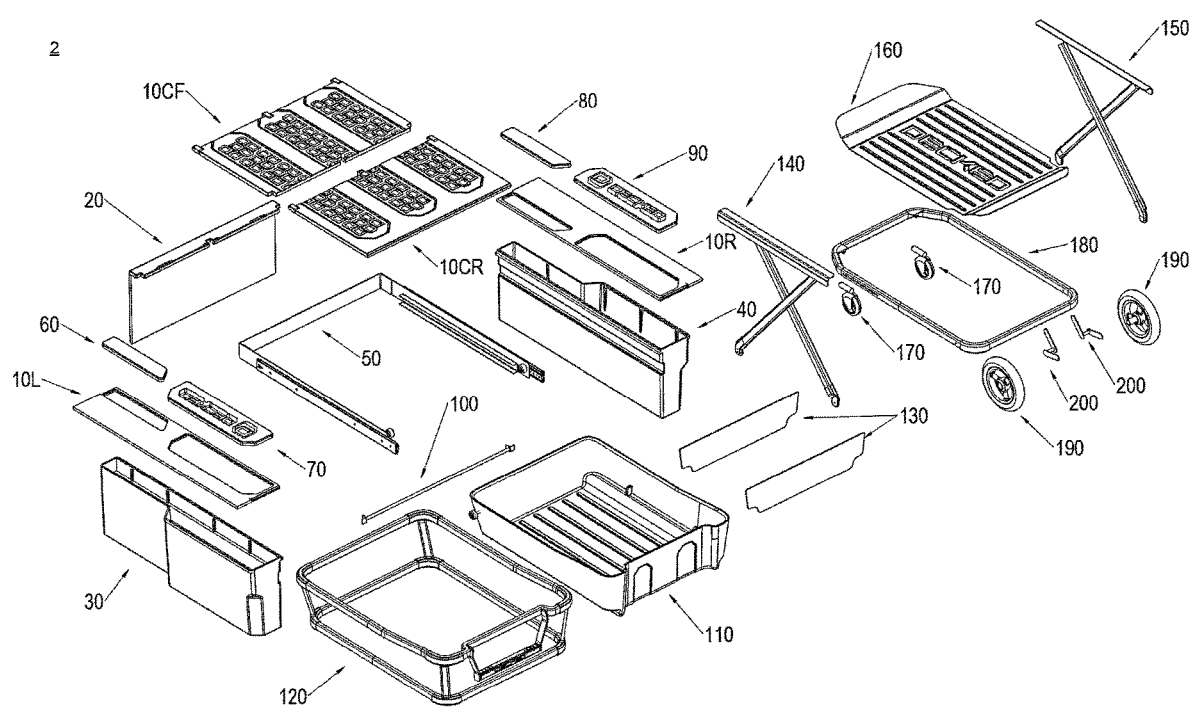
FIG. 11 shows a partially exploded view of the second exemplary embodiment of the vehicle storage system according to the present invention, depicted with the cart.

FIG. 7 shows a top perspective view and FIG. 11 shows a partially exploded view of a second exemplary embodiment of a vehicle storage system which may be, for example, a vehicle storage system 2 according to the present invention with a cart affixed to the bottom of the drawer assembly to allow payload to be transported to or removed from the vehicle.

As shown in FIGS. 7 and 11, the cart may comprise a lower frame assembly 180, a left side support assembly 140, a right side support assembly 150, a storage tray 160, two front wheel assemblies 170, two rear wheel assemblies 190, and two wheel pivot assemblies 200.

FIGS. 7,8,9 and 10 show various operational states of the second exemplary embodiment of the vehicle storage system 2 according to the present invention.

FIG. 7 shows vehicle storage system 2 in a retracted and closed position, similar to FIG. 1, in which the drawer assembly including drawer tub 110 and drawer supporting frame 120 are retracted into the main body of the vehicle storage system 2, and in which center front deck 10CF and center rear deck 10CR are both in a closed position, but also including the cart. Shown in FIG. 7 is a portion of lower frame assembly 180, storage tray 160, and two rear wheel assemblies 190. As in FIG. 1, such an operational state may occur, for example, when a vehicle is in motion and/or when the drawer contents are not needed. Center front deck 10CF and center rear deck 10CR may be provided so as to correspond to a front and rear portion of drawer tub 110, respectively, and which portions may be separated by drawer dividers 130.

Figure 8:
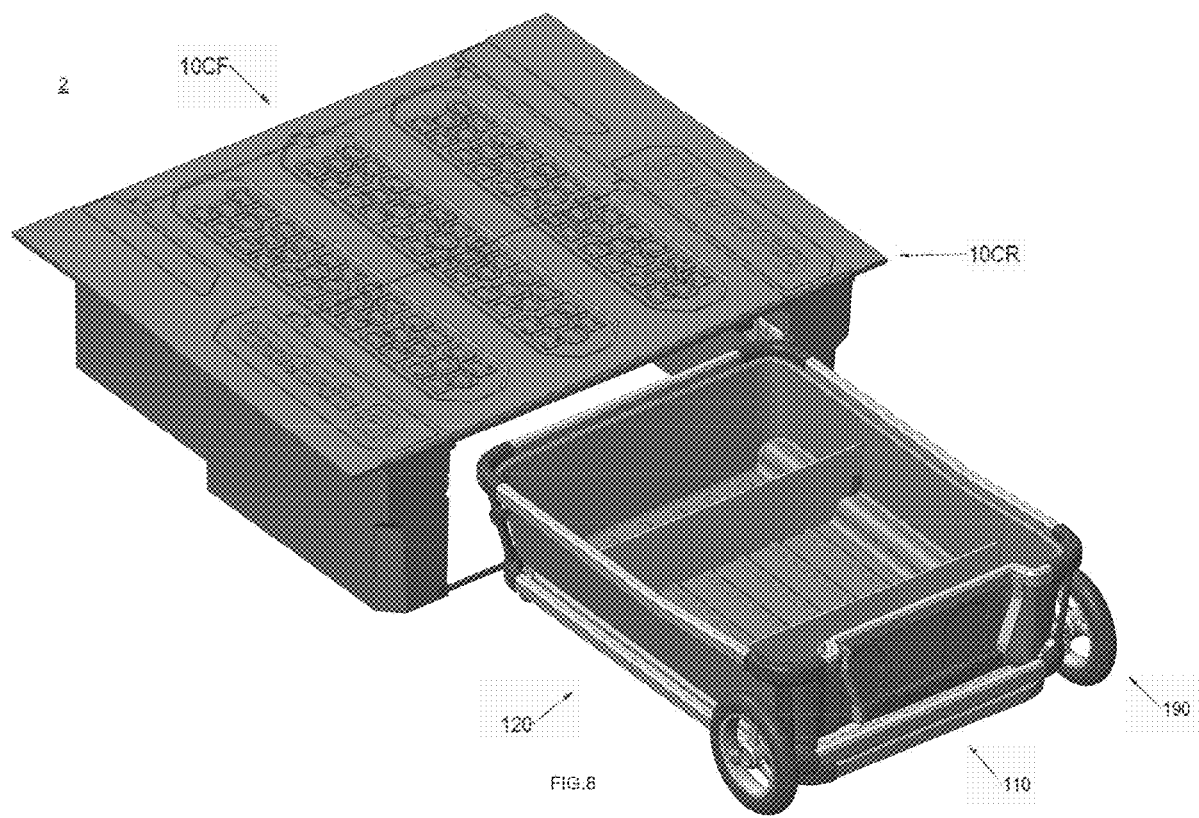
FIG. 8 shows a top perspective view of a second exemplary embodiment of a vehicle storage system according to the present invention, depicted with the drawer and the cart in an open state.

FIG. 8 shows vehicle storage system 2 in an extended, closed, and a removed position, in which the drawer assembly including drawer tub 110, drawer supporting frame 120, and a cart are extended out of the main body of the vehicle storage system 2 and are removed from the main body of the vehicle storage system 2, while both center front deck 10CF and center rear deck 10CR are in a closed position. Rear side of drawer tub 110, drawer supporting frame 120, and the cart may partially fit between the two rear wheel assemblies 190.

As in FIG. 4, drawer tub 110 and drawer supporting frame 120, and the cart, may be extended from and retracted into the main body of the vehicle storage system 2 via guide channel assembly 50, which may include drawer slides having a c-shaped channel which slideably receives a portion of drawer supporting frame 120 and/or drawer tub 110, allowing drawer supporting frame 120 and/or drawer tub 110 to extend and retract from the main body of the vehicle storage system 2. Guide channel assembly 50 may comprise rails, rollers or other mechanisms which allow for extension and retraction.

Figure 9:
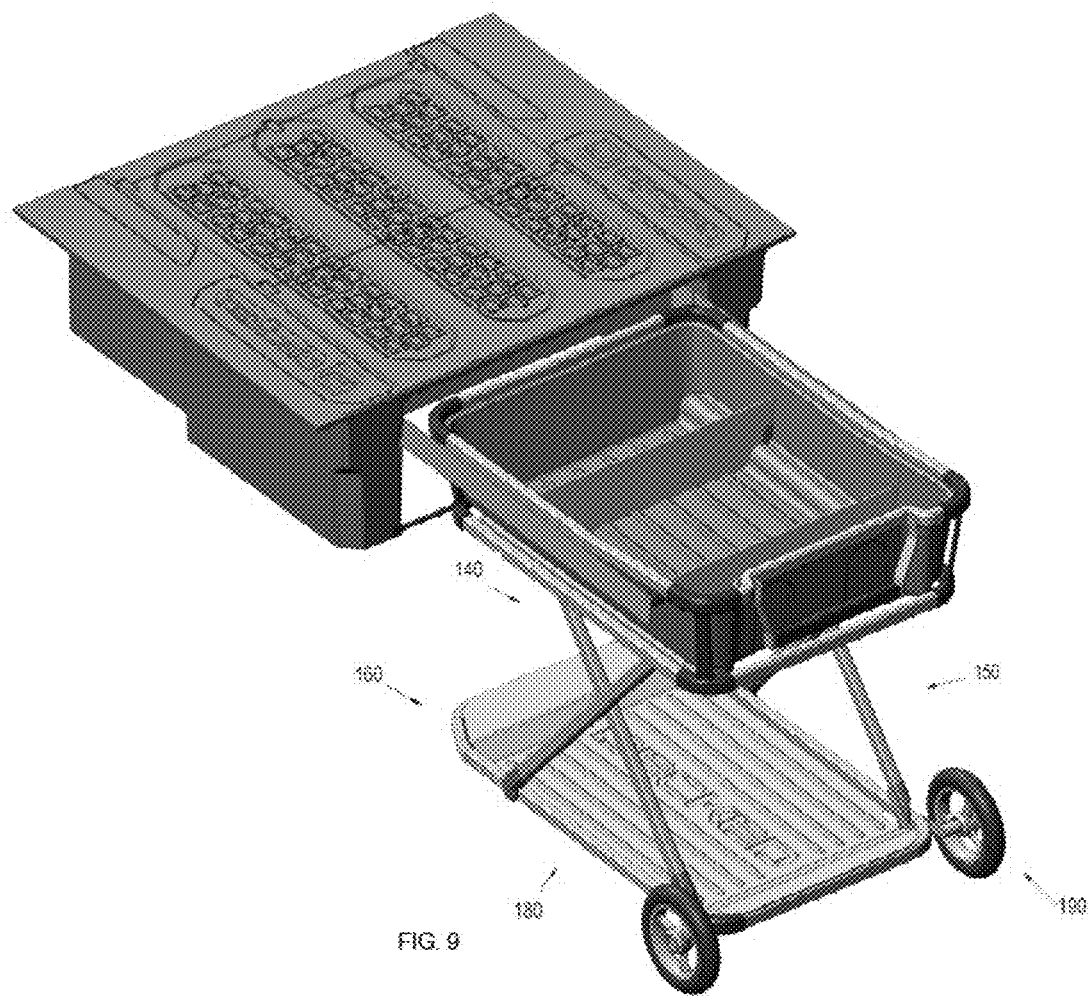
FIG. 9 shows a top perspective view of a second exemplary embodiment of a vehicle storage system according to the present invention, depicted with the drawer in an open state and the cart in a deployed state.

FIG. 9 shows vehicle storage system 2 in an extended and deployable position, in which the drawer assembly including drawer tub 110 and drawer supporting frame 120 are extended out of the main body of the vehicle storage system 2, and the cart is extended and deployed from the drawer assembly via the left side support assembly 140 and the right side support assembly 150. Also shown in FIG. 9 is lower frame assembly 180, storage tray 160, and two rear wheel assemblies 190. Lower frame assembly 180 may pivot from a collapsed position to a deployed position that is substantially parallel to the collapsed position, and may retract from the deployed position to the collapsed position. Storage tray 160 may be removably mounted or attached to lower frame assembly 180 and may pivot and retract along with lower frame assembly 180.

Figure 10:
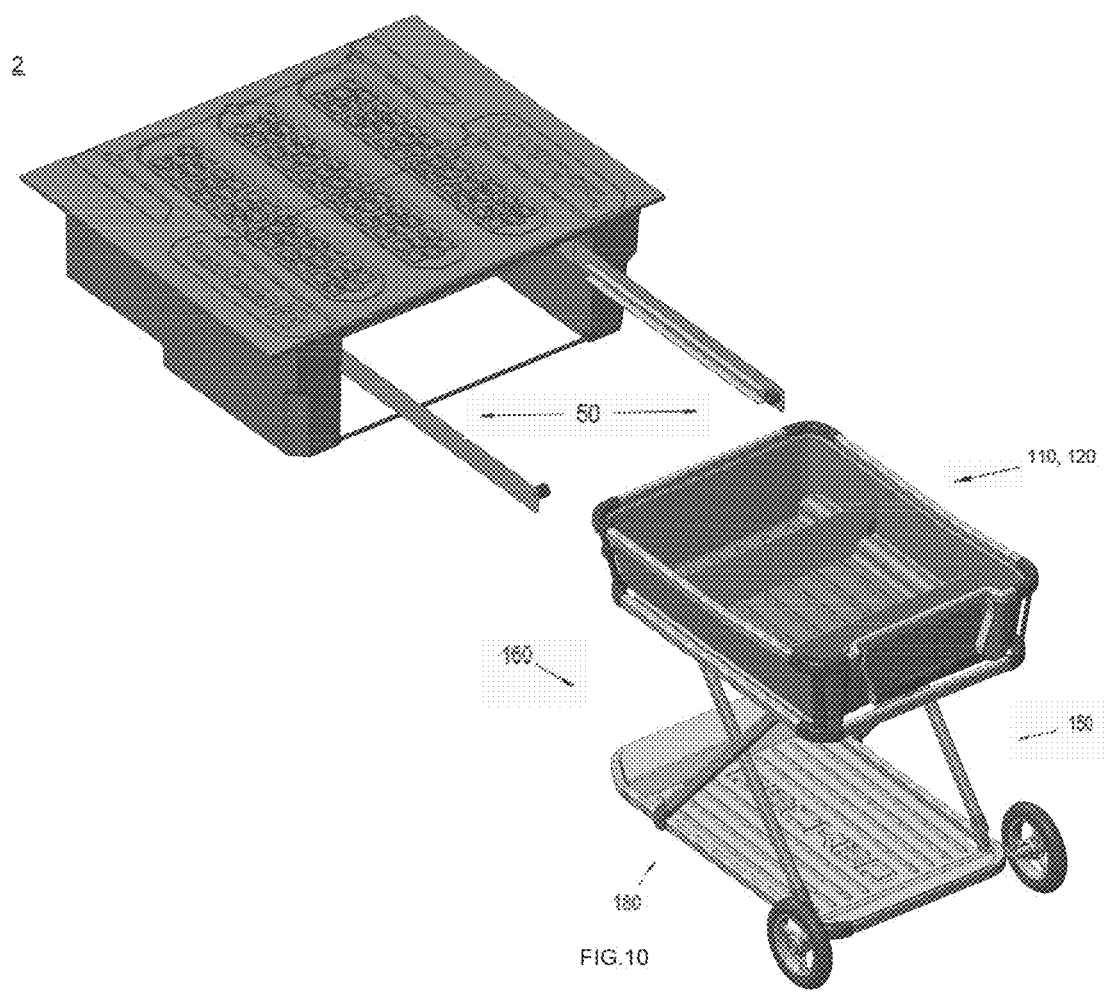
FIG. 10 shows a top perspective view of a second exemplary embodiment of a vehicle storage system according to the present invention, depicted with the drawer and the cart in a removed state.

FIG. 10 shows vehicle storage system 2 in an extended, deployable, and detached position, in which the drawer assembly including drawer tub 110 and drawer supporting frame 120, and cart, are extended out of the main body of the vehicle storage system 2, while the extended cart is removed and detached from the vehicle storage system 2. Drawer tub 110 and drawer supporting frame 120 may be detached from the guide channel assembly 50 to be removed from the vehicle storage system 2. In this way, for example, the drawer assembly can easily be transported via the cart to and from the vehicle by pulling and/or pushing the drawer assembly via a handle, for example. In addition, the drawer tub 110 and/or drawer supporting frame 120 can be detached from the cart.

Figure 12:
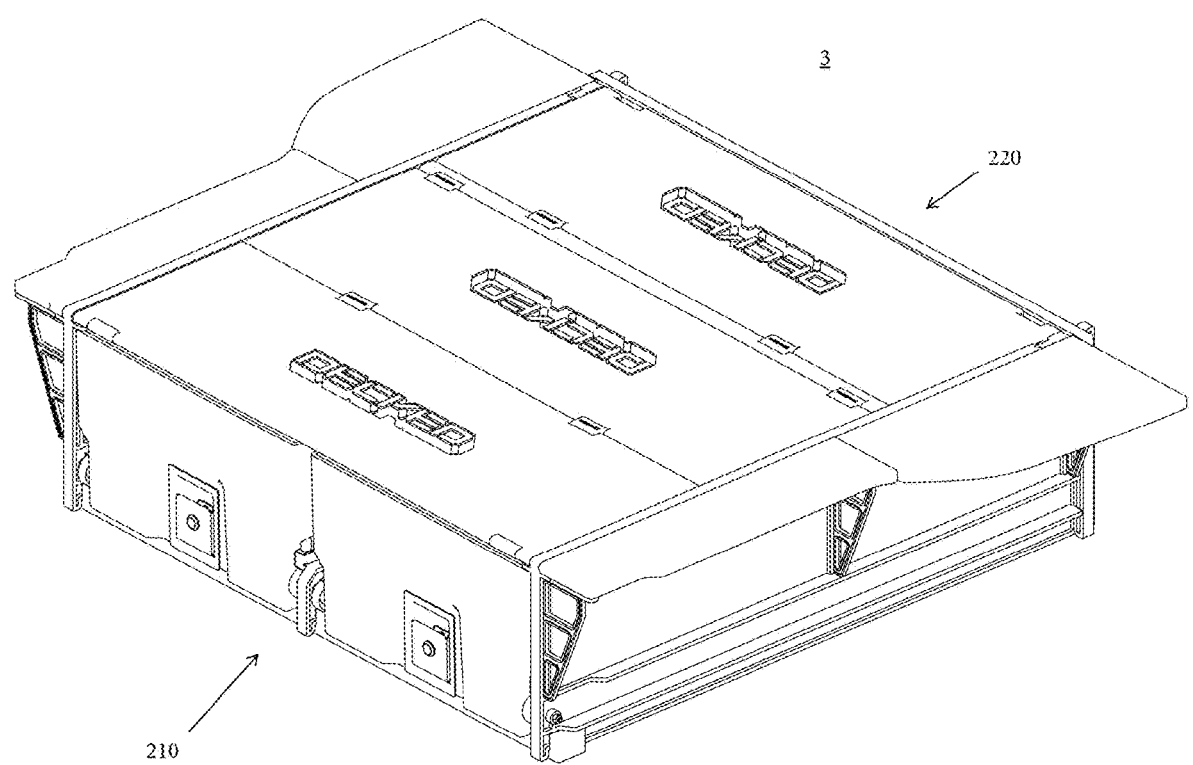
FIG. 12 shows a top perspective view of a multiple-drawer system with a load deck comprised of greater than two panels, each panel in a stowed position.

FIG. 12 shows vehicle storage system 3 having a multiple-drawer system 210 with a load deck 220 comprised of greater than two panels, each panel in a stowed position. As shown in FIG. 12, the deck 220 includes a front deck portion, a middle deck portion, and a rear deck portion, the front deck portion hinged to the middle deck portion, which is in turn hinged to the rear deck portion. In an alternative embodiment, vehicle storage system 3 may have a multiple-drawer system 210 with more than 2 drawers, and with a load deck 220 comprised of four or more panels, or may have a single drawer with a load deck 220 comprised of three or more panels, or may have a multiple-drawer system 210 with more than 2 drawers, and with a load deck 220 comprised of one or two panels. FIG. 12 shows vehicle storage system 3 in a retracted and closed position, in which the drawer assembly and drawer supporting frame are retracted into the main body of the vehicle storage system 3, and in which all three deck portions are in a closed position. Such an operational state may occur, for example, when a vehicle is in motion and/or when the drawer contents are not needed. Front deck portion, middle deck portion, and rear deck portion may be provided so as to correspond to a front, middle, and rear portion of the multiple drawer tubs, respectively, and which portions may be separated by drawer dividers.

Figure 13:
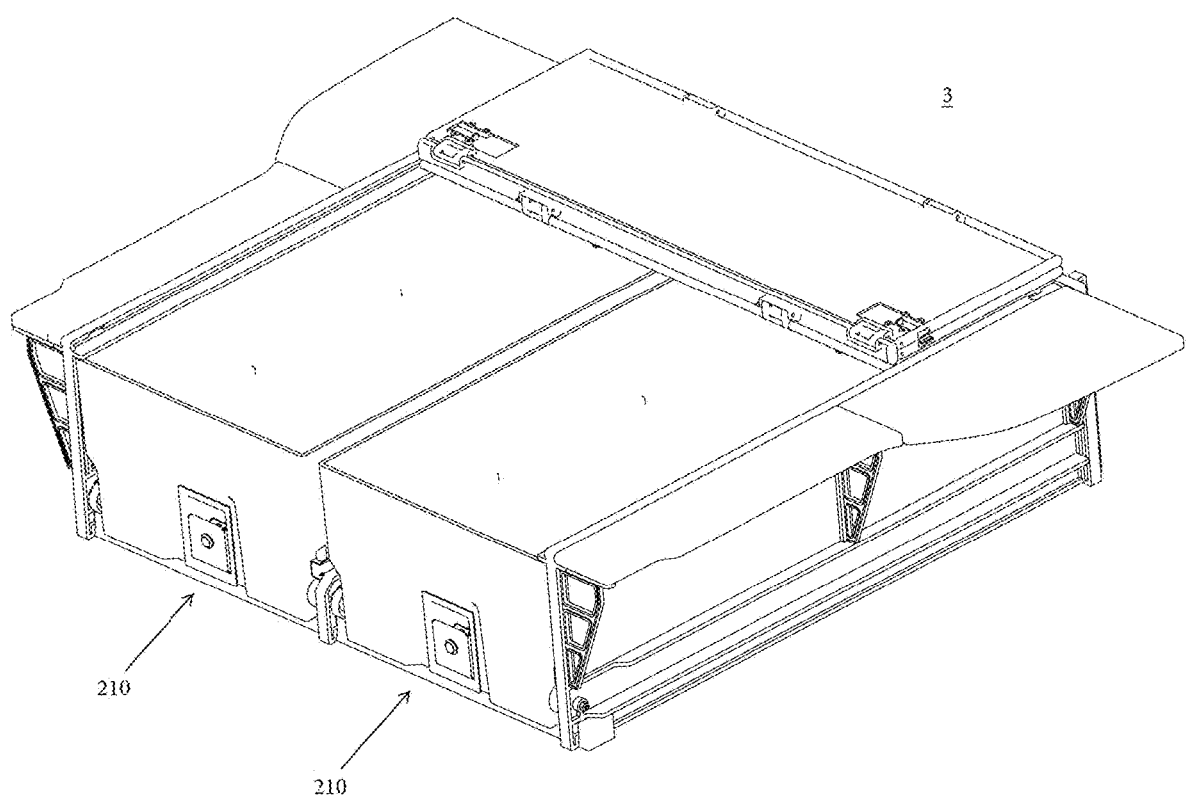
FIG. 13 shows a top perspective view of a multiple-drawer system with a load deck comprised of greater than two panels, with the rear and middle panel in an open state.

FIG. 13 shows vehicle storage system 3 having a multiple-drawer system with a load deck comprised of greater than two panels, with the rear and middle panel in an open state. As in FIG. 12, the deck 220 may include a front deck portion, a middle deck portion, and a rear deck portion, the front deck portion hinged to the middle deck portion, which is in turn hinged to the rear deck portion. FIG. 13 shows vehicle storage system 3 in a retracted and partially-opened position, in which the drawer assembly and drawer supporting frame are retracted into the main body of the vehicle storage system 3, and in which only the front deck portion is in a closed position. Such an operational state may occur, for example, when the drawer contents in the rear and middle portions of one or more drawer tubs are intended to be removed or contents are to be added to these portions, but not contents in the front portion of the one or more drawer tubs, or when there are no contents in the front portion of the one or more drawer tubs. While FIG. 13 shows the opening and folding occurring at a point about a third of the way along the longitudinal direction of the deck, the deck panels may instead be opened at other points along the deck and/or may be folded only partially, as discussed above. For example, the deck panels may be folded in a direction perpendicular to the deck and held up by one or more retractable stands protruding from the deck.

Figure 14:
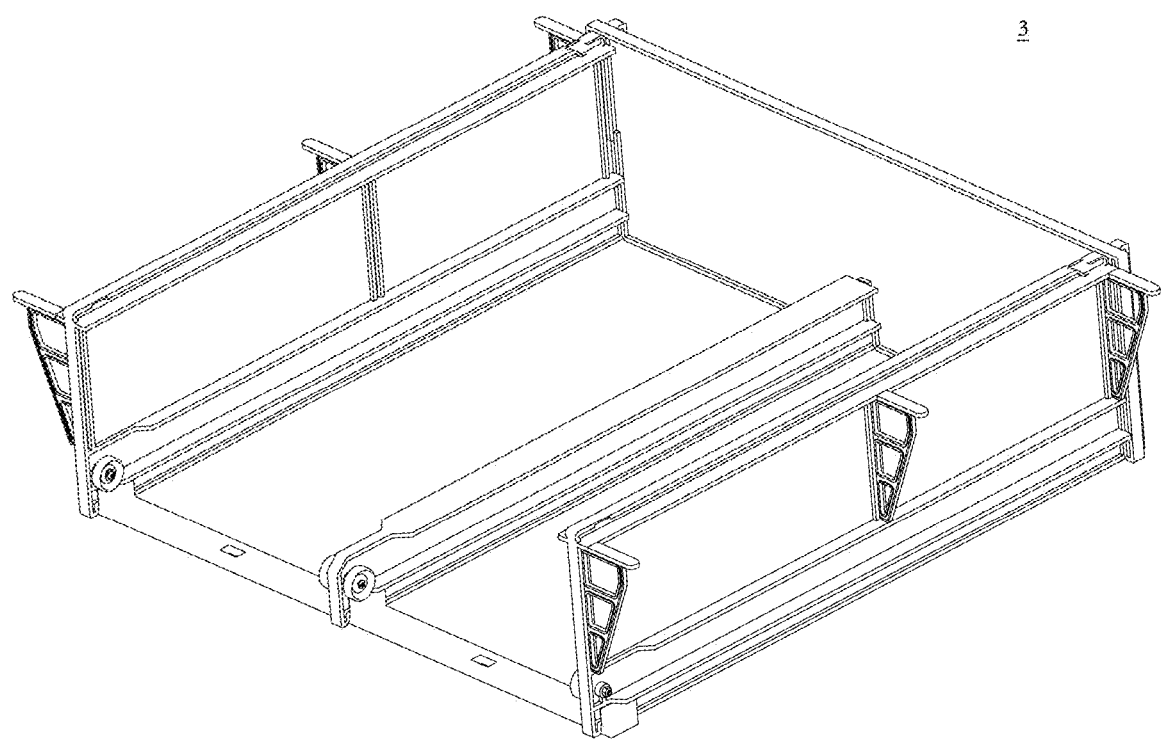
FIG. 14 shows a top perspective view of a system frame consisting of joined components allowing quick, tool-free disassembly.
Figure 15:
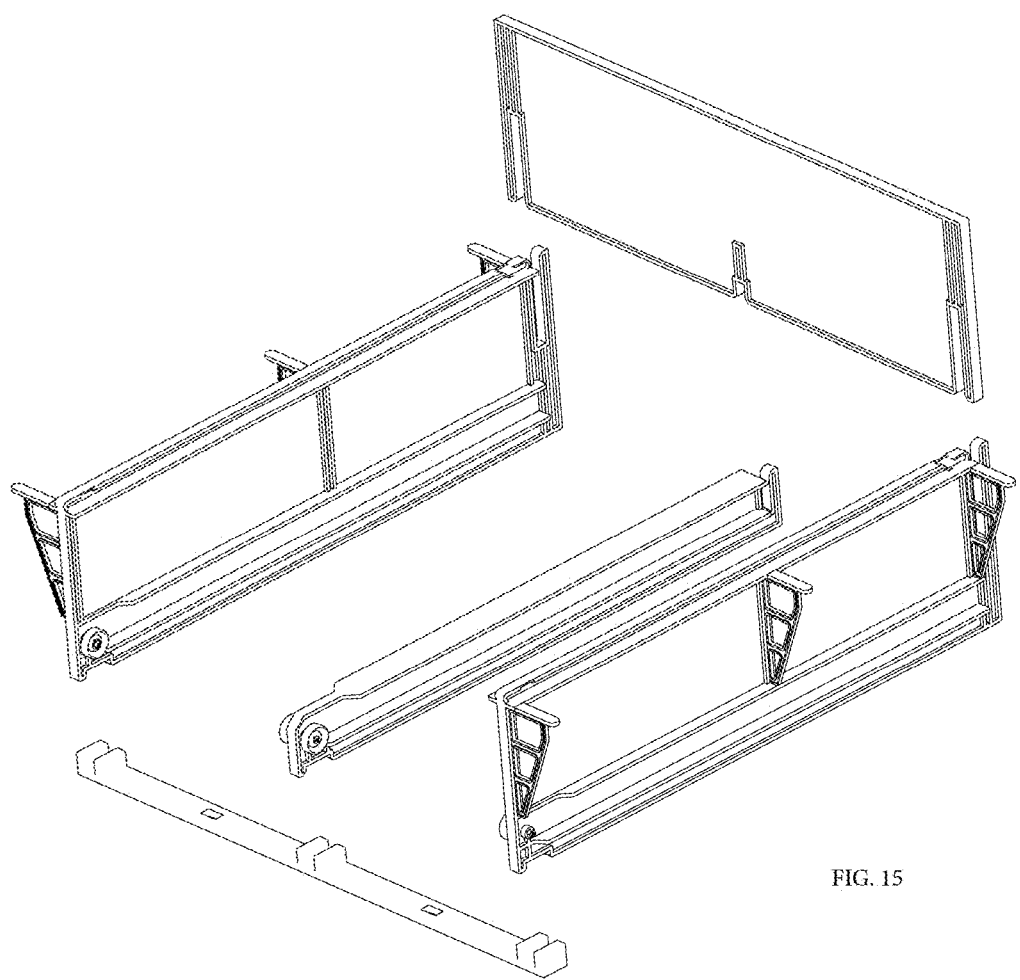
FIG. 15 shows a partially exploded view of a system frame consisting of joined components allowing quick, tool-free disassembly.

FIG. 14 shows a multiple-drawer system frame of the vehicle storage system 3, and FIG. 15 shows a partially exploded view of the multiple-drawer system frame. As shown in the Figures, the components may be joined in a manner to accommodate quick and easy assembly and disassembly, without requiring any tools, and the components may be portable and movable by a single user. The components may also include standard and/or simple connector interfaces which allow for quick engagement and disengagement of the various components.

Although the present invention has been described with reference to particular examples and exemplary embodiments, it should be understood that the foregoing description is in no manner limiting. Moreover, the features described herein may be used in any combination.

What is claimed is:

1. A vehicle storage system, comprising:
a deck configured to span substantially a total width of a vehicle bed; and
a drawer assembly including a supporting frame and at least one tub, wherein the drawer assembly is configured to extend, via a guide channel assembly, in a longitudinal direction of the vehicle bed past the deck, and configured to retract, via the guide channel assembly, under the deck,
wherein the drawer assembly is configured to detach from the guide channel assembly and be removed from the vehicle bed,
wherein the deck is configured to rotate between a closed position and an open position relative to the drawer assembly.

2. The system of claim 1, wherein the deck includes a front deck portion and a rear deck portion, the front deck portion and the rear deck portion hinged to each other.

3. The system of claim 2, wherein, in a first operating state, only the front deck portion is opened, in a second operating state, only the rear deck portion is opened, and in a third operating state, both the front deck portion and the rear deck portion are opened.

4. The system of claim 2, wherein the front deck portion and the rear deck portion correspond, respectively, to a front and a rear portion of the at least one tub.

5. The system of claim 4, wherein the front and the rear portions of the at least one tub are separated by a divider.

6. The system of claim 1, wherein the deck is configured to rotate at a midway point of the deck to open and/or close.

7. The system of claim 1, further comprising:
a front transverse vertical support, wherein the deck is hinged to the front transverse vertical support to open and close the deck relative to the drawer assembly.

8. The system of claim 1, wherein the at least one tub is configured to detach from the guide channel assembly while the supporting frame remains attached thereto.

9. The system of claim 1, wherein the drawer assembly is situated between at least two side support feet.

10. The system of claim 1, wherein the deck includes a front deck portion, a middle deck portion, and a rear deck portion, wherein the rear deck portion is hinged to the middle deck portion, and the middle deck portion is hinged to the front deck portion.

11. The system of claim 10, wherein, in a first operating state, only the rear deck portion is opened, in a second operating state, only the rear deck portion and the middle deck portion are opened, and in a third operating state, all of the deck portions are opened.

12. The system of claim 1, wherein the deck is configured to rotate at at least two different sections of the deck to open and/or close.

13. The system of claim 1, wherein the at least one tub includes at least two tubs that are arranged side by side in the longitudinal direction of the vehicle bed.

14. The system of claim 1, wherein the vehicle storage system is configured to be assembled and/or disassembled by an operator without tools.

15. A vehicle storage system, comprising:
a deck configured to span substantially a total width of a vehicle bed;
a drawer assembly including a supporting frame and at least one tub, wherein the drawer assembly is configured to extend, via a guide channel assembly, in a longitudinal direction of the vehicle bed past the deck, and configured to retract, via the guide channel assembly, under the deck; and
a cart affixed to a bottom portion of the drawer assembly,
wherein the drawer assembly is configured to detach from the guide channel assembly and be removed along with the cart from the vehicle bed,
wherein the deck is configured to rotate between a closed position and an open position relative to the drawer assembly.

16. The system of claim 15, wherein the cart is configured to switch between a collapsed configuration where the cart is folded up against the drawer assembly, and an expanded configuration where the cart is unfolded and at least partially supported by the ground.

17. The system of claim 16, wherein the cart includes a lower frame assembly, a left side support assembly, a right side support assembly, a storage tray, and at least two wheels.

18. The system of claim 17, wherein the cart is configured to unfold from the drawer assembly via the left side support assembly and the right side support assembly.

19. The system of claim 17, wherein a position of the lower frame assembly in the collapsed configuration is substantially parallel to a position of the lower frame assembly in the expanded configuration.

20. The system of claim 17, wherein the storage tray is removably mounted or attached to the lower frame assembly and configured to collapse and expand along with the lower frame assembly.

21. The system of claim 15, wherein the cart is configured to extend, along with the drawer assembly, in the longitudinal direction of the vehicle bed past the deck, and configured to retract, along with the drawer assembly, under the deck.

22. The system of claim 15, wherein the guide channel assembly includes drawer slides having a c-shaped channel which slideably receive a portion of the supporting frame and/or the at least one tub.

23. The system of claim 15, wherein the at least one tub and/or the supporting frame are configured to detach from the cart.

* * * * *